Oct. 7, 1930.                O. L. BARNEBEY                1,777,460
               APPARATUS FOR SEPARATING AND RECOVERING
               VAPORS AND GASES WITH ADSORBENT CARBON
                    Original Filed July 2, 1924    3 Sheets-Sheet 2

Inventor
Oscar L. Barnebey
By Ray S. Weber
Attorney

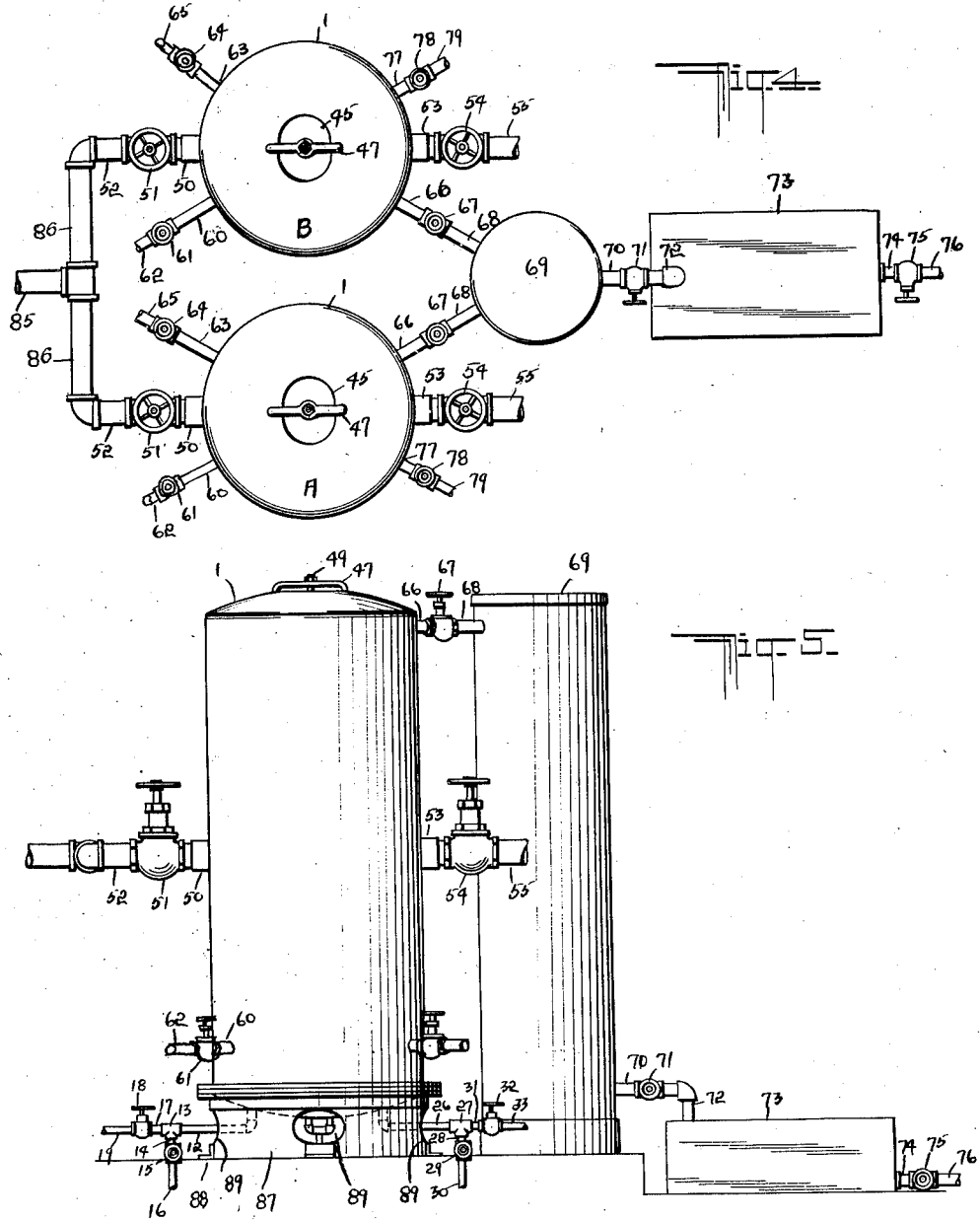

Patented Oct. 7, 1930

1,777,460

UNITED STATES PATENT OFFICE

OSCAR L. BARNEBEY, OF COLUMBUS, OHIO, ASSIGNOR TO AMERICAN SOLVENT RECOVERY CORPORATION, A CORPORATION OF OHIO

APPARATUS FOR SEPARATING AND RECOVERING VAPORS AND GASES WITH ADSORBENT CARBON

Application filed July 2, 1924, Serial No. 723,641. Renewed December 21, 1927.

My improved apparatus is especially adapted for the recovery of industrial gases and vapors with adsorbent carbon. In the apparatus the adsorbent carbon is positioned and used in such a manner as to secure an improved utilization of the adsorbent powers of the adsorbent carbon. Much improved yields are obtained in using this improved equipment and more economical operation is attained.

Granular adsorbent carbon is placed in the apparatus in such a manner as to cause minimum resistance to passage of gases through the carbon. Special arrangements of heating and cooling means are used to cause the adsorbent carbon to rapidly and efficiently remove the adsorbable gases and vapors from unadsorbable gases and likewise to effect rapid and efficient distillation of the adsorbed gases and vapors from the carbon. Further, means are provided to rapidly cool the hot carbon after distillation, thus preparing the carbon for reuse in subsequent adsorption of gas and vapors.

The steps of adsorption, distillation and cooling, are performed in succession continuously in regular cycles suitable for each specific application, such performance being conducted more efficiently than heretofore by use of the improved apparatus herewith described.

In my apparatus I provide means for the assembly of component parts of the equipment in an improved manner. I arrange my adsorbers vertically. The adsorbers are constructed in such a manner as to allow them to be taken apart in sections. The outer casing or shell constitutes one part of section. The supporting ring forms the foundation. A base plate fits onto the supporting ring. A tube sheet fits onto the base plate. The base plate and tube sheet are curved outward thus producing a chamber called the distributing chamber which is divided into two parts which are separated by a central web. Into the tube sheet is welded, rolled or threaded an internal heating and cooling coil system in such a manner as to form a single unit of the tube sheet and coils. The outer casing or shell with its angle and screen supports fits down over the heating coil system and onto the tube sheet.

The flanges for outer casing, tube sheet and base plate are adapted to be bolted securely together so that the assembled unit functions as one compact piece of construction yet with such sections I can take the equipment readily apart for repairing or for any other necessity which may arise. By these provisions one part of the equipment can be replaced without replacing the entire structure if such replacement is required due to wear, corrosion or any other factor.

Referring to the drawings I shall describe one form of my invention in detail.

Fig. 4 is a plan view of a pair of the adsorbers and devices preferably associated therewith;

Fig. 5 is a side elevation of the apparatus shown in Fig. 4.

Figure 1:
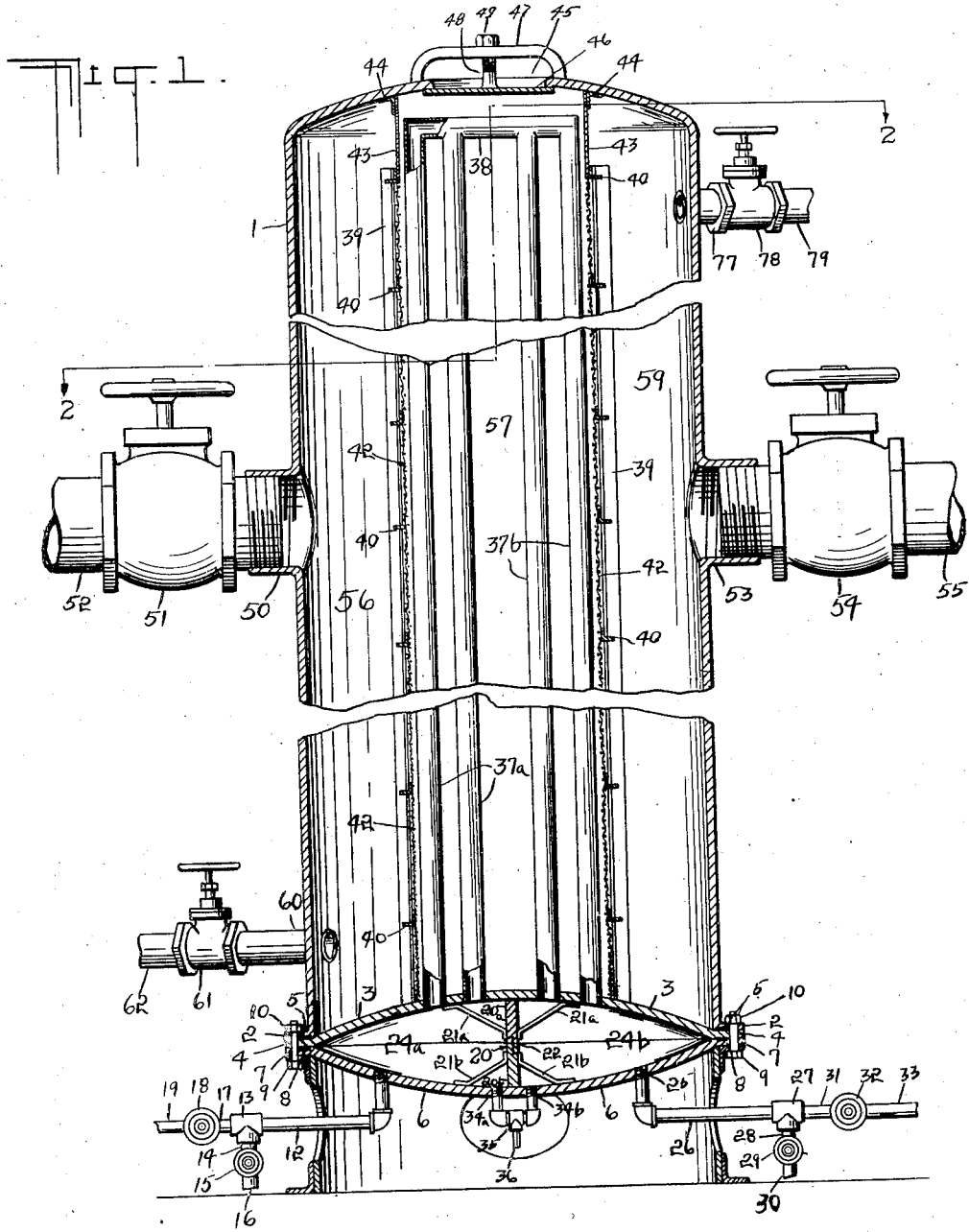
Fig. 1 is a vertical cross section of one of my improved adsorbers.
Figure 2:
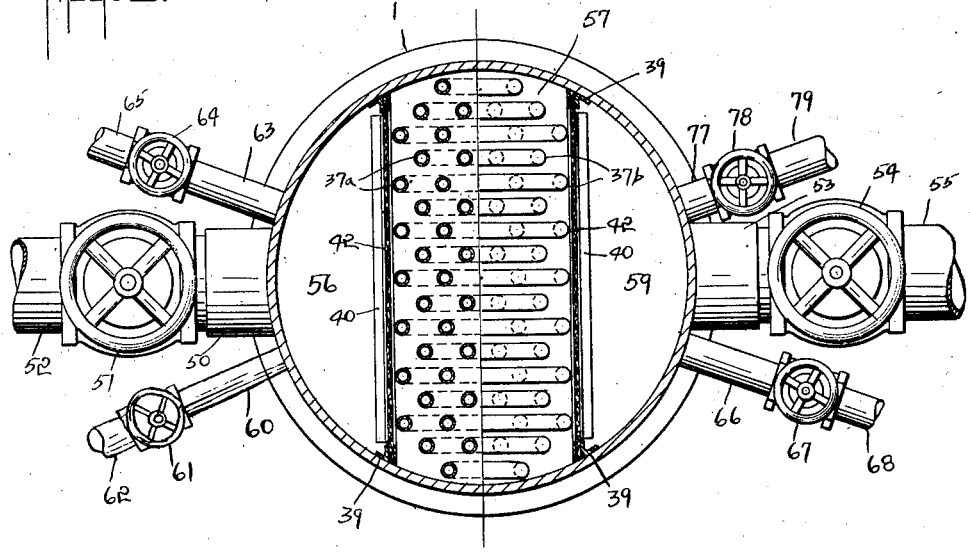
Fig. 2 is a horizontal cross section on the line 2—2 of Fig. 1.
Figure 3:
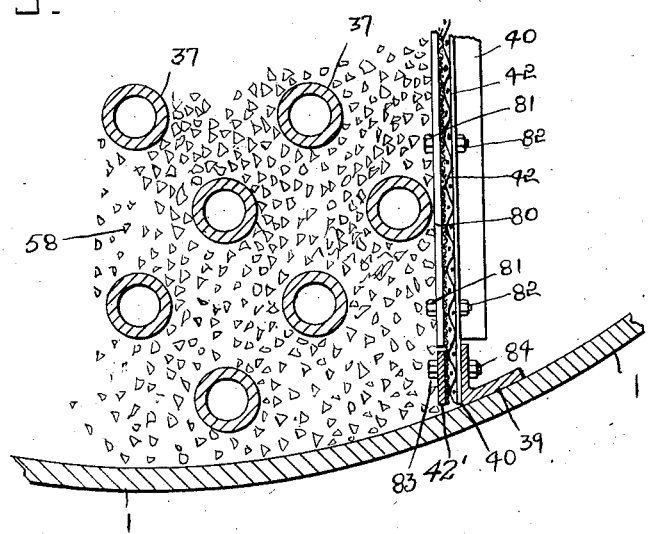
Fig. 3 is an enlarged fragmentary horizontal section showing in detail the construction and arrangement of the adsorbent carbon and embedded heating and cooling coil system.

Referring first to the construction of the adsorbers as illustrated in Figs. 1, 2 and 3, the outer casing or shell 1 of one of my adsorbers possesses the flange 2 adapted to be fitted tightly to tube sheet 3, possessing flange 4 and gasket 5. Tube sheet 3 is also adapted to fit tightly to base plate 6 possessing flange 7 and gasket 8.

Flanges 2, 4 and 7 are capable of being drawn tightly together by means of bolts 9 and nuts 10, thus forcing the gaskets firmly in contact with the flanges in such a manner as to prevent any gas leak whatever in operation of the assembly units.

Into the base plate is attached pipe 12 which divides at T 13 into an intake cold water line 14 with valve 15 and connection 16, also an intake steam line 17 with control valve 18 and connection 19. There is a web 20 which is divided into two parts $20^a$ and $20^b$, $20^a$ being welded to the tube sheet 3 and $20^b$ welded to the base plate 6. The supporting angles $21^a$ and $21^b$ hold the divided web securely in position. At 22 the lower part of web section $20^a$ and the upper part of the web section $20^b$ fit tightly against each other in such a manner as to be steam and water tight, yet are adapted to move over the surface of each other in such a manner as to take care of expansion and contraction due to heating and cooling. This web construction divides the space between tube sheet 3 and base plate 6 into two distributing chambers $24^a$ and $24^b$. Into $24^b$ is attached connection 25 with pipe 26 and T 27 from which pipe 28 with valve 29 and prolonged connection 30 removes the warm water from the adsorber to any desired discharge and line 31 with valve 32 and prolonged connection 33 removes the cold water remaining in the adsorber cooling system as cooling is completed.

Into $24^a$ and $24^b$ are attached pipes $34^a$ and $34^b$ for removing the steam condensed in the adsorbers and collected as water in the distributing compartments $24^a$ and $24^b$. Pipes $34^a$ and $34^b$ are united with T 35 and condensate returned through pipe connection 36 by means of a steam trap (not shown) to the boilers which furnish the steam.

Pipes $37^a$ and $37^b$ are rolled, welded or threaded into tube sheet 3 such pipes being united by headers or U bends 38. Angles 39 are riveted or welded to shell 1. Cross angles 40 are riveted or bolted to angle 39. Double screens 42 are bolted securely to cross angles 40. The screens thus form a pair of longitudinally extending foraminous partitions dividing the shell 1 into three chambers or zones, the central chamber or zone being designed to hold the adsorbent material. Sheet iron plates 43 are bolted or riveted to angles 44, projecting down inside the screens 42 forming a bin at the top over the tubes, such bin being adapted to hold an excess of adsorbent carbon over and above that required to fill the space around the heating and cooling tubes and between the two screens, this excess being provided against settling of the granular adsorbent carbon in the center zone of the adsorber. Settling of the granular carbon after installation of the apparatus thus cannot open a short circuit path for the vapors or gases from the inlet zone over the top of the carbon to the outlet zone, the plates 43 being, of course, impervious to the gas and the capacity of the bin being great enough to more than compensate for the settling that occurs.

Manholes 45 to receive carbon are provided, such being closed by manhole plates 46, cooperating with arms 47, bolts 48 and nuts 49.

Into shell 1 is a connection 50 for intake of gaseous mixture with its control valve 51 and connection 52 to gas mixture source or to a blower capable of supplying the gaseous mixture under pressure at least sufficient to blow the air through the equipment and out through the outlet 53 with its control valve 54 and connection 55 which conducts the unadsorbed gases to any desired place.

In passage of gas into the adsorber through 52, 51 and 50 the gaseous mixture first passes through distributing zone 56, then through the double screen and the adsorbent carbon zone 57 containing granular carbon 58, then through the next double screen and into the collecting zone 59 and passing from thence to 53, 54 and 55, leaving the adsorbers.

Steam pipe connections 60 with valve control 61 and connections 62 are provided to add steam directly to zone 56 of the adsorbers. Air pipe 63 with valve control 64 and connections 65 are provided to add hot or cold air to zone 56. Distillate pipe 66 with valve control 67 and connections 68 connect the adsorbers to condenser 69.

Line 70 with valve 71 and connection 72 conduct the liquid condensate to a receiver or storage tank 73. Line 74 with valve 75 and connection 76 provide means for withdrawing liquid from the receiver or storage tank 73. Hot air exit 77 with valve control 78 and connections 79 are provided for exiting from zone 59.

Referring to the detail of Figure 3 the strap iron strips 80 are bolted to the double screen 42 and to angles 40 by means of bolts 81 and nuts 82. Bolts 83 and nuts 84 are also shown fastening angles 39 to angles 40 and to screen frame support 42′. In Figure 4 is also shown manifold 85 and connection 86 which conducts the gaseous mixture from source or from blower under positive pressure through the intake pipes 52 to the adsorbers.

Figure 5 illustrates the circular base support 87 with base angle 88 and holes 89 through which pipe connections can be made to base plate 6 of the adsorber.

In the operation of the above described apparatus, the gaseous mixture is supplied by means of a blower having a definite capacity, the mixture being blown through 86, and manifold 85. The blower capacity is adjusted to suit the amount of gas to be handled per unit of time in conjunction with the size of adsorbers to be used.

Considering adsorber A the valves 51 and 54 are open, all other valves being closed. Valves 15 and 29 of adsorber A are then opened to allow cooling water to pass through pipes $37^a$ and $37^b$ to cool the carbon. The gaseous mixture passes through adsorber A, distributes through zone 56 and passes laterally through the adsorbent carbon 58 of zone 57 and from thence collects in zone 59 and passes out through 53, 54 and 55 to any desired place adapted to receive the unadsorbed gases. When adsorber A is substantially saturated with adsorbable gases or vapors valves 51, 54, 15 and 29 of adsorber A are closed and corresponding valves of adsorber B opened so that adsorber B may proceed to saturation. Meantime valve 18 of adsorber A is opened to admit steam and valve 32 is temporarily opened to vent the residual water from the tube system.

When the water is vented the valve control of steam condensate trap connected with pipe 36 is opened to return to the boilers the condensed steam which condenses within the heating coils. Valve 67 is opened to allow distillate to go to condenser. Valve 61 is opened to admit some direct steam. The distilled gases or vapors along with steam are liquefied in the condenser and drawn off through valve 71 to receiver or storage tank 73. The distillation is continued until solvent gas or vapor has been substantially all distilled, after which the valves 61 and 67 are closed. I prefer to use steam at from 80 to 150 pounds pressure both for the heating of the imbedded coils and for direct contact with the adsorbent carbon.

Hot air is then blown in through 65 by opening valve 64 and the moisture laden air is exited through 79 by opening valve 78. Whenever there is an appreciable amount of valuable gases or vapors escaping through exit 79 such gases or vapors are by-passed through a cooler and then passed into adsorber B in order to prevent such loss.

When the moisture has been dispelled from adsorber A the hot air is shut off and cold air added through valve 64. Meantime the steam is shut off by closing valve 18 and condensate valve is also closed. Cold water is then added by opening valves 15 and 29. When the adsorbent carbon is cold the air valves 64 and 78 are closed and cooling water stopped by closing valves 15 and 29. Adsorber A is then ready for readsorption of more gases and vapors. When adsorber B is saturated the gaseous mixture is turned into adsorber A again and adsorber B is distilled, moisture removed and cooled in the same manner as previously described for adsorber A.

It is to be observed that air for drying and cooling the adsorbent carbon cannot safely be contacted with the carbon, especially in the presence of inflammable vapors and gases, at greatly elevated temperatures. However, I have demonstrated that if the temperature of the carbon does not exceed that corresponding to steam pressures of 150 pounds, the air can be used for drying and cooling the carbon in the manner described with entire safety.

The process is continued time after time repeating the various steps in the manner described to give continuous operation. The solvent recovered is removed from receiver 73 from time to time by opening valve 75 and conducting the same to any place desired. If the solvent is immiscible with the condensed water physical separation is made by withdrawing the layers separately from each other. If, however, the solvent recovered is entirely or partially soluble in water then distillation is used to separate the solvent from the water by any conventional method in standard practice.

The number of adsorbers used in any assembly of units varies with the nature of the gaseous mixture, the concentration of solvent vapor or gas to be recovered and other specific factors. Under any given set of conditions the number and size of adsorbers required can be readily computed and installed along with the appropriate number and size of blowers, coolers, condensers, receivers and separators, in such a manner as to give a continuous operating unit or units. The smallest number of adsorbers which can be used to give continuous operation is two and three or more can be used frequently to advantage for each unit of equipment.

The process herein described in connection with the use of the apparatus constitutes the subject matter of my copending application Serial No. 723,643 filed of even date herewith.

While I have shown and described a preferred form of construction it is to be understood that there can be various modifications and changes without departing from the invention as defined in the appended claims.

I claim:

1. In an apparatus for recovery of gases and vapors by adsorption, the combination of an elongated substantially cylindrical upright shell; a head closing one end of the shell; a head structure closing the other end of the shell and formed with a plurality of header chambers; two upright foraminous partitions spaced from each other and extending from side to side and end to end of the shell to form therein a central zone and two side zones; granular solid adsorbent material supported by the said foraminous partitions in the central zone; heat interchange tubes embedded in the adsorbent material and having both their inlet and outlet ends secured in the chambered head structure with their inlet ends opening into one of the header chambers and their outlet ends opening into another header chamber; an inlet conduit for gases communicating with one of the said side zones of the shell; and an outlet conduit for unadsorbed gases communicating with the other of said side zones of the shell.

2. In an apparatus for recovery of gases and vapors by adsorption, the combination of an elongated substantially cylindrical upright shell; a head closing one end of the shell; a head structure closing the other end of the shell and formed with a plurality of header chambers; two upright foraminous partitions spaced from each other and extending from side to side and end to end of the shell to form therein a central zone and two side zones; granular solid adsorbent material supported by the said foraminous partitions in the central zone; heat interchange tubes embedded in the adsorbent material and having both their inlet and outlet ends secured in the chambered head structure with their inlet ends opening into one of the header chambers and their outlet ends opening into another header chamber; an inlet conduit for gases communicating with one of the said side zones of the shell; an outlet conduit for unadsorbed gases communicating with the other of said side zones of the shell; an inlet conduit for steam opening into one of the said side zones; and an outlet conduit for distillate leading from the other of said side zones.

3. In an apparatus for recovery of gases and vapors by adsorption, the combination of an elongated substantially cylindrical upright shell; a head closing one end of the shell; a head structure closing the other end of the shell and formed with a plurality of header chambers; two upright foraminous partitions spaced from each other and extending from side to side and end to end of the shell to form therein a central zone and two side zones; granular solid adsorbent material supported by the said foraminous partitions in the central zone; heat interchange tubes embedded in the adsorbent material and having both their inlet and outlet ends secured in the chambered head structure with their inlet ends opening into one of the header chambers and their outlet ends opening into another header chamber; an inlet conduit for gases communicating with one of the said side zones of the shell; an outlet conduit for unadsorbed gases communicating with the other of said side zones of the shell; a conduit for conducting air or other drying and (or) cooling gas into one of the side zones; and a conduit for leading such air or gas out of the other side zone.

4. In an apparatus for recovery of gases and vapors by adsorption, the combination of an elongated substantially cylindrical upright shell; a head closing the upper end of the shell; a head structure closing the lower end of the shell and formed with a plurality of header chambers; two upright foraminous partitions spaced from each other and extending from side to side and end to end of the shell to form therein a central zone and two side zones; granular solid adsorbent material supported by the said foraminous partitions in the central zone; heat interchange tubes embedded in the adsorbent material and having both their inlet and outlet ends secured in the chambered head structure with their inlet ends opening into one of the header chambers and their outlet ends opening into another header chamber; an inlet conduit for gases communicating with one of the said side zones within the shell; an outlet conduit for unadsorbed gases communicating with the other of said side zones of the shell; and outlets for condensate leading from both of the said header chambers.

5. In an apparatus for recovery of gases and vapors by adsorption, the combination of a substantially cylindrical upright shell; a head closing the upper end of said shell; a head structure closing the lower end of said shell and comprising an upwardly dished tube plate and a downwardly dished plate enclosing a space between them and a partition structure between said plates dividing said space into an inlet header chamber and an outlet header chamber; said plates and the adjacent end of the shell having peripheral flanges rigidly secured together; a structure upon which the said flanges rest to support the shell; two upright foraminous partitions spaced from each other and extending from side to side and end to end of the shell to form therein a central zone and two side zones; granular solid adsorbent material in the central zone between said partitions; heat interchange tubes embedded in said adsorbent material and having both their inlet and outlet ends secured in the said upwardly dished end plate with the inlet ends of the tubes in communication with the inlet header chamber and the outlet ends of the tubes in communication with the outlet header chamber; an inlet conduit for gases communicating with one of the side zones of the shell; and an outlet conduit for unadsorbed gases communicating with the other side zone of the shell.

6. In an apparatus for recovery of gases and vapors by adsorption, the combination of an upright shell; head structures closing the lower and upper ends of said shell; two upright foraminous partitions spaced from each other and extending from side to side and end to end of the shell to form therein a central zone and two side zones, the said partitions having sections at their upper ends impervious to gas and vapor; a stationary body of granular solid adsorbent material supported by the said partitions in the central zone and completely filling the portion of said zone bounded by the foraminous parts of the said partitions; an opening in the upper head structure fitted with a removable closure and giving access to the central zone; an inlet conduit for gas communicating with one of said side zones of the shell; an outlet conduit for unadsorbed gases communicating with the other of said side zones of the shell; an inlet conduit for steam opening into one of said side zones and an outlet conduit for distillate leading from the other of said side zones.

7. In an apparatus for recovery of gases and vapors by adsorption, the combination of an upright cylindrical shell; head structures closing the lower and upper ends of said shell; two upright foraminous partitions spaced from each other and extending from side to side and end to end of the shell to form therein a central zone and two side zones, the said partitions having sections at their upper ends impervious to gas and vapor; a stationary body of granular solid adsorbent material supported by the said partitions in the central zone and completely filling the portion of said zone bounded by the foraminous parts of the said partitions; an opening in the upper head structure fitted with a removable closure and giving access to the central zone; an inlet conduit for gas communicating with one of said side zones of the shell; an outlet conduit for unadsorbed gases communicating with the other of said side zones of the shell; an inlet conduit for steam opening into one of said side zones and an outlet conduit for distillate leading from the other of said side zones.

8. In an apparatus for recovery of gases and vapors by adsorption, the combination of an upright shell; head structures closing the lower and upper ends of said shell; two upright foraminous partitions spaced from each other and extending from side to side and end to end of the shell to form therein a central zone and two side zones, the said partitions having sections at their upper ends impervious to gas and vapor; granular solid adsorbent material supported by the said partitions in the central zone and completely filling the portion of said zone bounded by the foraminous parts of the said partitions; heat interchange tubes imbedded in the adsorbent material; supply and discharge means for passing fluid through said tubes; an opening in the upper head structure fitted with a removable closure and giving access to the central zone; an inlet conduit for gas communicating with one of said side zones of the shell; and an outlet conduit for unadsorbed gases communicating with the other of said side zones of the shell.

9. In an apparatus for recovery of gases and vapors by adsorption, the combination of an elongated upright cylindrical shell; head structures closing the lower and upper ends of said shell; two upright foraminous partitions spaced from each other and extending from side to side and end to end of the shell to form therein a central zone and two side zones; a stationary body of granular solid adsorbent material supported by said partitions in the central zone; an opening in the upper head structure fitted with a removable closure giving access to the central zone; an inlet conduit for gases communicating with one of the said side zones of the shell; an outlet conduit for unadsorbed gases communicating with the other of said side zones of the shell, an inlet conduit for steam opening into one of said side zones and an outlet conduit for distillate leading from the other of said side zones.

In testimony whereof, I hereunto affix my signature.

OSCAR L. BARNEBEY.